(12) United States Patent
Hanna

(10) Patent No.: US 8,358,026 B2
(45) Date of Patent: Jan. 22, 2013

(54) WAVE ENERGY TURBINE FOR OSCILLATING WATER COLUMN SYSTEMS

(76) Inventor: John Clark Hanna, Coquille, OR (US)

(*) Notice: Subject to any disclaimer, the term of this patent is extended or adjusted under 35 U.S.C. 154(b) by 0 days.

(21) Appl. No.: 13/136,409

(22) Filed: Aug. 1, 2011

(65) Prior Publication Data
US 2012/0038163 A1 Feb. 16, 2012

Related U.S. Application Data

(60) Provisional application No. 61/401,340, filed on Aug. 12, 2010.

(51) Int. Cl.
*F03B 13/12* (2006.01)
(52) U.S. Cl. ....................................................... 290/54
(58) Field of Classification Search ............... 290/53–55
See application file for complete search history.

(56) References Cited

U.S. PATENT DOCUMENTS

| | | | | | |
|---|---|---|---|---|---|
| 4,405,866 | A * | 9/1983 | Masuda et al. | ................ | 290/53 |
| 4,438,343 | A * | 3/1984 | Marken | ................ | 290/53 |
| 5,424,582 | A * | 6/1995 | Trepl et al. | ................ | 290/53 |
| 6,994,047 | B1 * | 2/2006 | Pent, III | ................ | 114/230.27 |
| 7,298,054 | B2 * | 11/2007 | Hirsch | ................ | 290/42 |
| 8,046,108 | B2 * | 10/2011 | Hench | ................ | 700/286 |

* cited by examiner

*Primary Examiner* — Truc Nguyen

(57) ABSTRACT

The dual rotor turbine configuration efficiently harnesses oceanic wave energy within an oscillating water column system. The up and down movement of the waves creates a bi-directional pneumatic airflow which spins the twin turbine assemblies. The resulting rotary force is then utilized to drive two electrical generators simultaneously. Each turbine rotor set is composed of a radial array of identical asymmetrical airfoil blades (similar to NASA GA(W)-1). The two rotor sets are assembled as back-to-back minor images. Both rotor sets are locked to a common axle by means of sprag-type freewheeling clutches. This configuration provides for smooth and continuous unidirectional movement of the axial drive line which drives the two generators.

2 Claims, 7 Drawing Sheets

Figure 1:
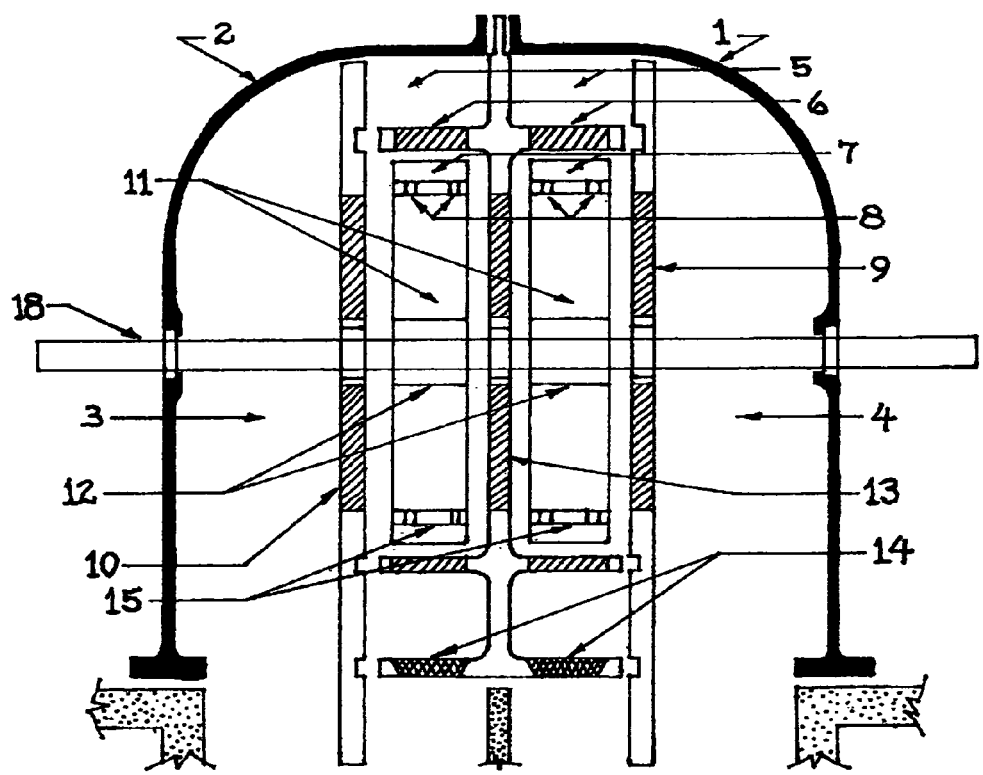

SECTION 1-1
CENTRAL BULKHEAD
ASSEMBLY

WAVE ENERGY TURBINE FOR OSCILLATING WATER COLUMN SYSTEMS

This application was preceded by a provisional patent application titled "Wave Energy Conversion Turbine for Oscillating Water Column Systems" filed on Aug. 12, 2010 and bearing application No. 61/401,340, customer number 99489.

BACKGROUND OF THE INVENTION

To improve the effectiveness of energy harvesting, ocean Wave Energy Conversion (WEC) devices need a more efficient bi-directional air turbine. Specifically, Oscillating Water Column (OWC) systems offer unique challenges. As the water level rises and falls within an OWC wave capture chamber, the resulting compressed air stream will reverse direction with every wave cycle. When a pneumatically driven turbine is exposed to this reciprocating air flow, a standard axial flow turbine design would have a tendency to reverse its rotational direction. This is unacceptable if a turbine has been designated to be the Power-Take-Off (PTO) device to spin an electrical generator.

Several prior art approaches to resolve this problem have been patented. Perhaps, most notably, is a device described by Professor Alan A. Wells of Queens University in Belfast, Ireland. The Wells Turbine, as his device is commonly referred to, overcame the bi-directional air flow problem. His turbine consisted of a series of symmetrical airfoil blades that radiated out from a common shaft. The blades were configured to be perpendicular to the air stream so that the turbine would rotate in a single direction regardless of the direction of air flow.

The Wells blade configuration has a high angle of attack relative to the air flow. This introduces performance and efficiency issues with regard to lift and stall characteristics. Consequently, over the past three decades, WEC device developers and independent researchers have attempted to improve the operation of the Wells design.

Expensive and complex variable pitch and counter-rotating blade designs have resulted in modest gains in efficiency. The Wells design continues to be challenged by low efficiency, issues with low-speed operation, a small operating window, and an inability to self-start under many conditions.

In addition to the Wells Turbine, other OWC turbines currently in use include: (a) impulse turbines (analogous to a Pelton Wheel adapted for air) which use guide vanes and ducting to force the air stream into a unidirectional flow through the turbine, and (b) variable pitch axial turbines like the Denniss-Auld Turbine which rely on complex movable blades to adapt to the reversing flow every cycle.

Despite a large body of work from India and Japan attempting to refine the Wells Turbine, the design falls short of being a reliable and efficient PTO device. In consideration of the current state of technology and the need for efficient, cost-effective renewable energy, a new turbine design is described as follows:

BRIEF SUMMARY OF THE INVENTION

The object of the present invention is to provide a simple and robust uni-directional turbine design for use in reciprocating air flow environments. The size is scalable between four and nine feet in diameter, thus it can be configured to the job at hand. The device has two rotors with asymmetrical airfoils (11) that are coupled to a common shaft (18) by means of free-wheel (Sprag-type) clutches (12) located at the center of each of the rotor hubs. Both of the rotor assemblies are made up of an even number of hollow airfoil blades (11). The leading edges of the radial blades are oriented at an optimal angle of attack to the oncoming axial air stream.

Since the air stream will reverse during a complete wave cycle, each rotor set is a mirror image of the other. Depending on the direction of air flow, the air will impinge upon the leading edges of one rotor set while passing on to the trailing edges of the blades in the other rotor set. The trailing edges of the downstream rotor blades are configured to produce some lift and will assist in maintaining directional momentum.

The Sprag-type clutch (12) in each of the hubs allows the upstream (drive) rotor to turn the shared axle shaft (18), while the other downstream (passive) rotor is in a free-wheeling condition exerting little frictional loss to the common axle (18). Thus, the axle will rotate at all times in one direction, regardless of air flow direction.

Both rotor sets are enclosed within a hemispherical pressure containment dome that is bisected into separate half sections (1 & 2) by a central bulkhead (13). Each half section is further divided by two outboard bulkheads (9 & 10). Each of the two rotor sets is positioned between the central and outboard bulkheads.

The central bulkhead supports a fixed radial array of curved guide vanes (13) which have their concave surfaces oriented in the direction of the turbine's rotation. The two outboard bulkheads support a radial array of flat guide vanes (9 & 10). The fixed outboard guide vanes direct either the upstream or downstream air flow onto the leading edges of the upstream or downstream rotor blades (11). The fixed concave central guide vanes (13) direct the upstream or downstream airflow from the trailing edges of one set of rotor blades to the trailing edges of the other rotor set.

It is seen that the pressure containment dome is separated into four distinct chambers by the three bulkheads. The two outermost chambers (3 & 4) serve the primary duct to convey the air flow axially through the outboard guide vanes (9 & 10) to the turbine blades (11). The two inboard chambers (5) serve to convey the air flow through a series of orifice plates (14) with one-way flapper lids. The orifice plates reduce the ambient air pressure and increases velocity. This higher velocity air stream is then directed radially through a fixed stator composed of louvered collector guide vanes (6). These are oriented to distribute air in the direction of rotation to a plurality of directional collector vanes (7). The collector vanes are set perpendicular to the high velocity chamber (5) and are angled outward all around the annular rings (15) of each rotor set. These directional vanes serve two purposes: (a) to aid in the rotor's directional momentum in concert with the spinning airfoil blades (11) and, (b) to supply high velocity air to collector ports (8) located in the annulus (15).

The collector ports (8) force air into the hollow airfoil blades (11) in each rotor which then distributes the high velocity air through turbulators (16) and jets (17). The turbulators are located in the airfoil blades' upper surfaces and serve to reduce aerodynamic stalling by delaying flow separation in the blades' boundary layers. The jets are slotted orifices located lengthwise at the trailing edges of each airfoil blade. They slant the high velocity air downwards which aids in smoothing out vortex turbulence and also virtually increases the chord of each blade, improving the lift coefficient in a similar way that wing flaps on an aircraft will add lift at low airspeeds.

When viewed as a cyclic event, one half of the pressure containment vessel (1) receives an onrush of compressed air from the Oscillating Water/Air Column (21). The energy of the rising oceanic water in the wave capture chamber (20) acts as a piston and compresses the entrained air inside the OWC (21). The compressed air is then directed through the two chambers (4 &5) in the oceanic half of the pressure dome—one chamber (4) directs air through the outboard guide vanes (9) to energize the upstream rotor blades (11). Simultaneously, the other chamber (5) forces air through the one-way orifice plates (14) to energize the upstream collector vanes (7) and thence to supply the turbulators (16) and jets (17). At this phase of the wave cycle, the applied torque causes the upstream rotor's clutch (12) to engage the common drive shaft (18). This rotor will then be temporarily in a "drive" mode.

When the air exits from the turbulators (16) and jets (17), it rejoins the axial air flow in the turbine. The air stream continues through the concave guide vanes in the central bulkhead (13) and impinges upon the trailing edges of the downstream rotor located in the atmospheric half of the pressure dome (2). Although the rotor blades are designed to provide a small amount of lift even when air strikes at their trailing edges, the torque produced is less than that which is developed by the "drive" rotor. Therefore, the downstream rotor's clutch will not engage and will be in a "freewheel" mode.

To complete the transfer of kinetic energy derived from the peaking wave, the compressed air flows over the freewheeling, downstream radial blades (11) and past the outboard guide vanes (10) in the atmospheric side of the pressure containment dome (2). It then exhausts to the atmosphere through an elliptical-shaped bell mouth (19).

When the ocean wave falls off, the water level drops in the wave capture chamber (21). This drop causes air to be sucked back into the bell mouth (19) from the atmosphere. The cycle is then completed in reverse order. Air enters the atmospheric half of the pressure containment dome (2) and enters the two chambers (3 & 5) which now become the upstream casings. As before, one chamber (3) supplies axial flow air to the rotor blades and the other (5) supplies high velocity air radially to the collector vanes (7) and efficiency-enhancing devices (16 & 17) designed into the hollow airfoil blades (11). The sprag-type clutch (12) in the hub of the atmospheric rotor engages and it now becomes the "drive" member. The other rotor in the oceanic half of the dome (1) assumes the "freewheel" mode. When another passing wave begins to rise, the cycle is repeated.

Figure 2:
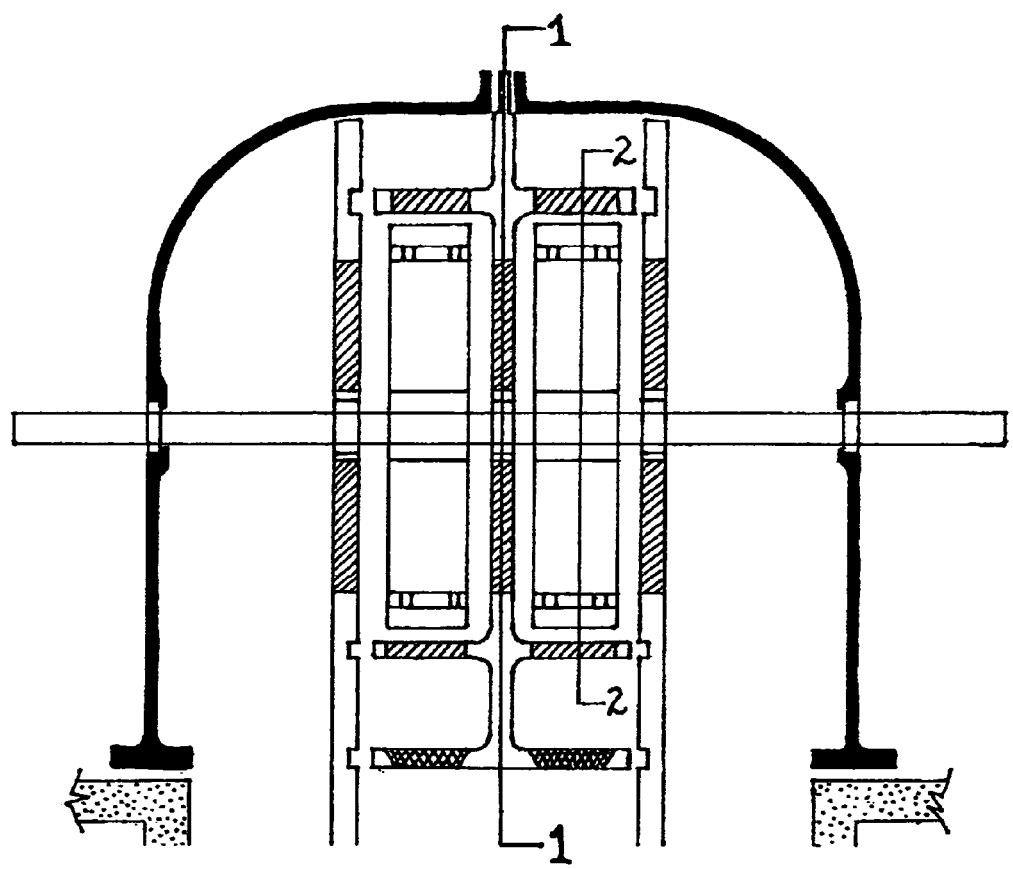
Figure 3:
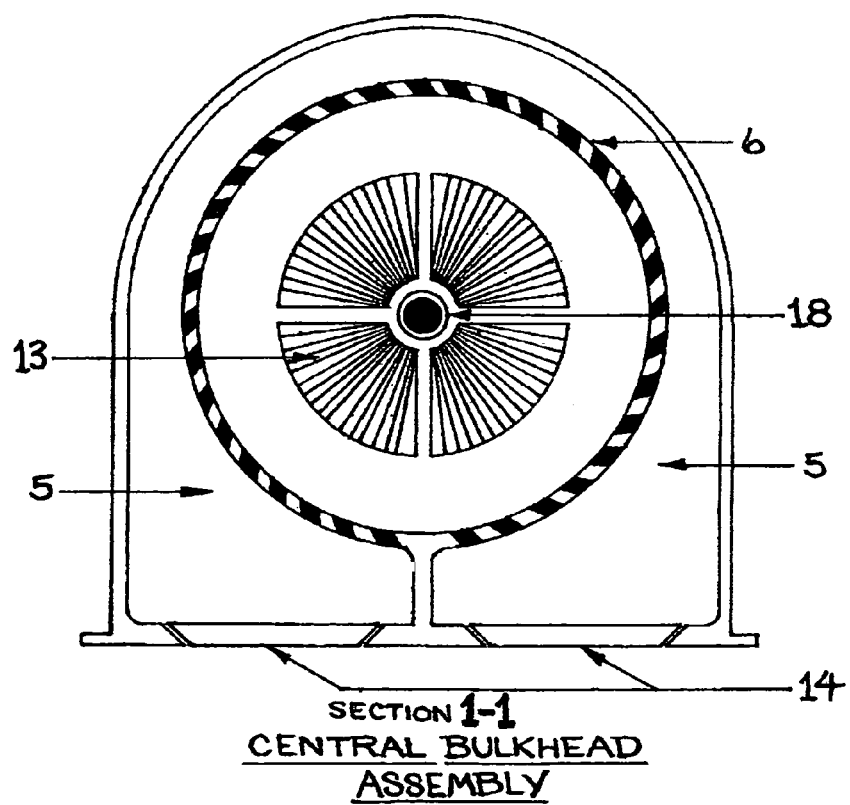
Figure 4:
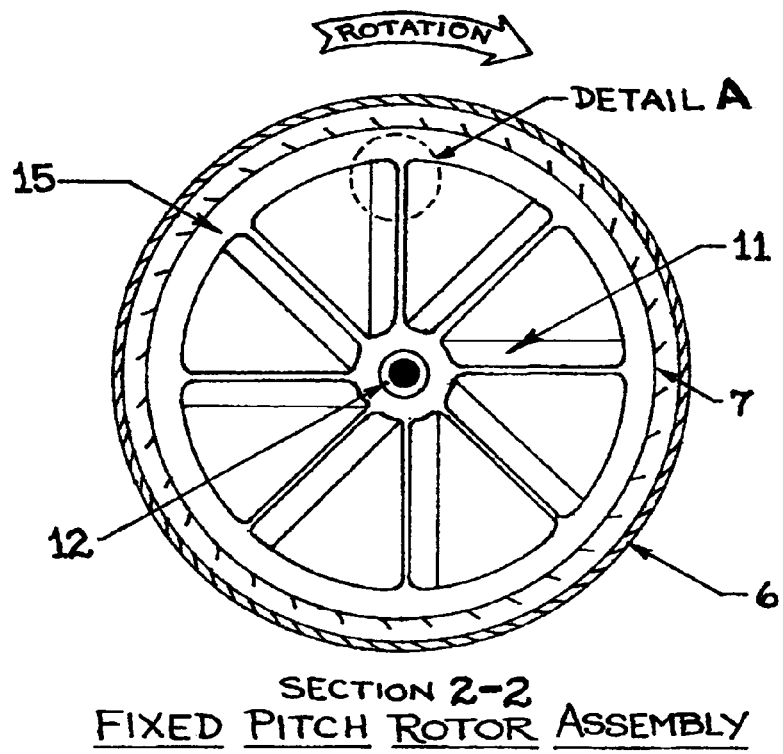
Figure 5:
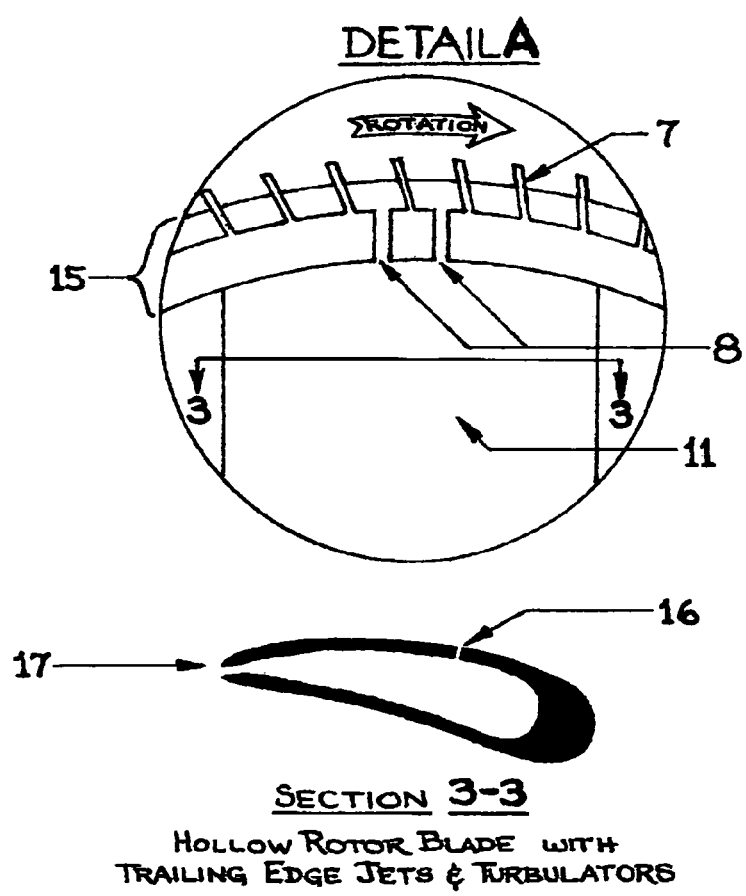
Figure 6:
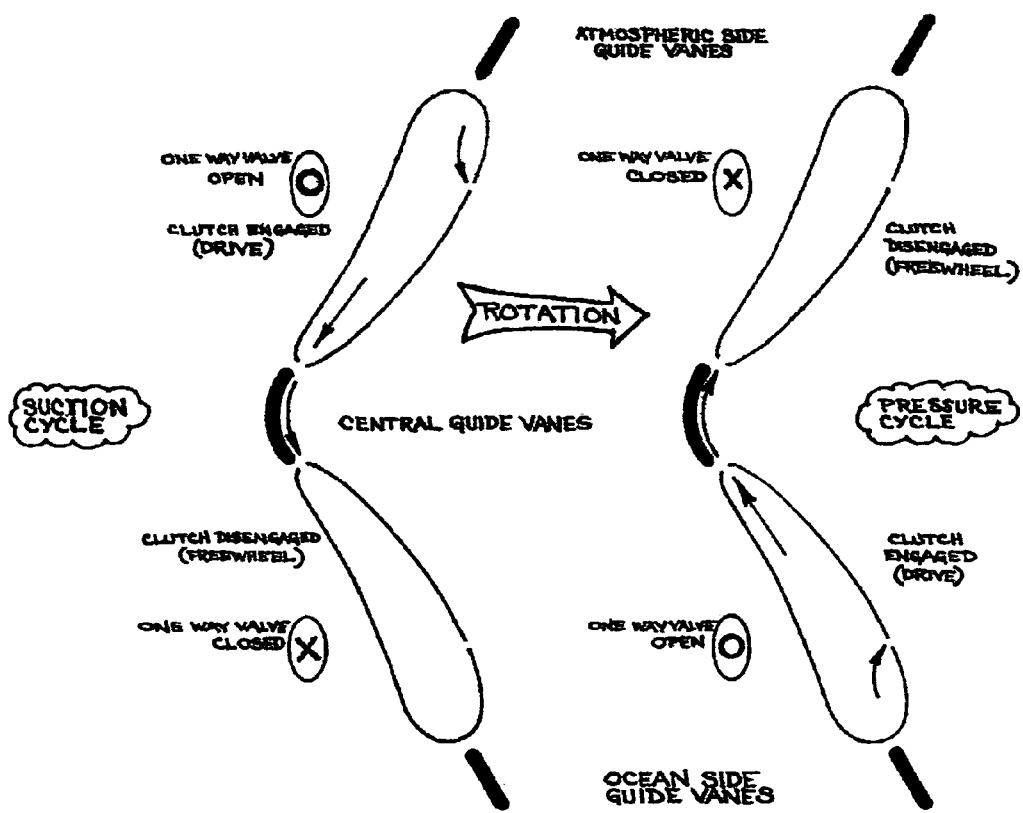
Figure 7:
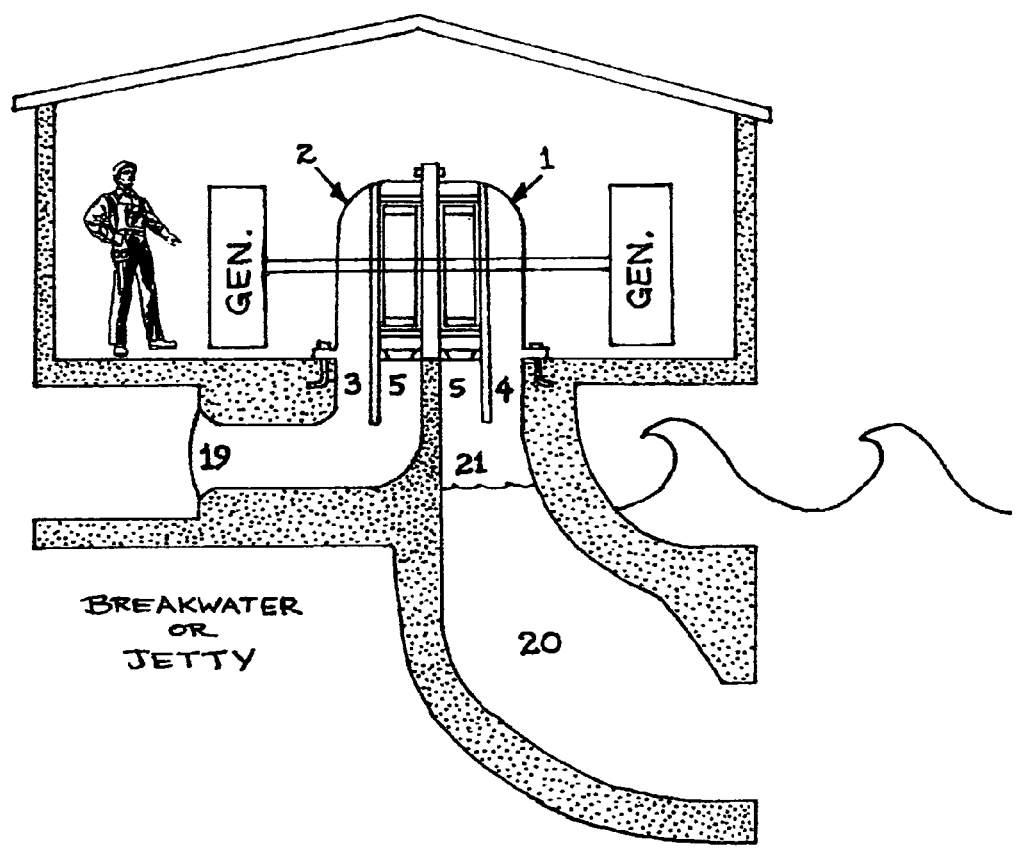

BRIEF DESCRIPTION OF THE SEVERAL VIEWS OF THE DRAWINGS (1) Pressure Containment Dome, Oceanic Side Half Section Housing
(2) Pressure Containment Dome, Atmospheric Side Half Section Housing
(3) Primary Chamber, Atmospheric Side Casing
(4) Primary Chamber, Oceanic Side Casing
(5) Inboard Collector Chambers, High Velocity Air Casings
(6) Louvered Collector Guide Vanes
(7) Directional Collector Vanes
(8) Collector Ports
(9) Outboard Bulkhead and Guide Vanes, Oceanic Side
(10) Outboard Bulkhead and Guide Vanes, Atmospheric Side
(11) Hollow Airfoil Blades
(12) Hub-mounted, Sprag-type Freewheeling Clutches
(13) Central Bulkhead and Concave Guide Vanes
(14) One-way Orifice Plates (valves) with Flapper Lids
(15) Annulus or Diffuser Rings
(16) Turbulators
(17) Jets
(18) Common Axle Shaft with Bearings, thrust bearings and Seals
(19) Bell Mouth Duct or Casing (Jetty-based)
(20) Wave Capture Chamber (Jetty-based)
(21) OWC, Oscillating Water/Air Column Casing (Jetty-based)
FIG. 1/7: A cross sectional elevation view of the turbine assembly
FIG. 2/7: A view having two cross sectional cut lines indicating a 90-degree perspective
FIG. 3/7: Section view 1-1 as referenced on FIG. 2/7—Central Bulkhead assembly
FIG. 4/7: Section view 2-2 as referenced on FIG. 2/7—Fixed Pitch Rotor assembly
FIG. 5/7: Detail "A" as referenced on FIG. 4/7 and section view 3-3—Rotor Blade
FIG. 6/7: A schematic plan view illustrating the turbine's full operating cycle
FIG. 7/7: A simple sketch illustrating the turbine and electric vault placed on a jetty

DESCRIPTION OF THE PREFERRED EMBODIMENT

The invention can be utilized in multiple applications where it could be employed by other WEC developers as a useful energy extraction PTO subsystem in their own OWC-based devices. Some of these applications could serve near and off shore systems such as anchored buoy farms where each buoy could support one or more turbines. Other applications would have the turbine attached to the legs or support structure of off shore oil platforms or other floating structures that have a suitable wave climate. Smaller turbine assemblies would work well as a power source for navigational or data acquisition buoys.

The most useful application for the current invention would be as a shore-based turbine, built into new or existing jetties, breakwaters or piers. Shore-based turbines can be housed in pre-cast concrete utility vaults where all the electrical generating and grid conversion devices can function together in a dry environment. The shore-based turbines would allow for easy maintenance and repair operations. Synchronized, utility grade power can easily be connected to local power transmission lines.

New construction on jetties can be designed to accommodate multiple built-in turbines. These could have a two or three-tiered system of turbines laid out in rows. Each tier would have its own configuration of OWC. Depending on the daily changes in wave climate (based on fetch, magnitude and period), a given OWC tier can efficiently extract the optimal level of useable wave energy.

The turbine's rotor components will make use of light weight, plastic, carbon fiber and other high strength, non-corrosive, non-conductive composite materials. This will be the foundation of the design's emphasis on implementing a "Design-for-Manufacture" approach for producing a simple, robust and highly efficient turbine. There will be a selection of different hollow airfoil blades (11) to choose from (see page 5/7, detail A). Each airfoil design will be adaptable to varying local wave conditions. All airfoils will be an interchangeable, one-piece component that will insert easily between the turbine rotor's hub (12) and annulus (15). This versatility also facilitates cleaning of the blades (11), particularly the hollow interior, turbulator (16) and jet (17) openings (see page 5/7, section 3-3).

The rotor's diffuser ring (15), collector vanes (7) and collector ports (8) will be a single component cast of non-corrosive, non-conductive materials (see drawing 5/7, section 1-1). The central bulkhead and curved guide vanes (13) will be a single, high density plastic casting which will also incorporate the fixed collector guide vanes (6) and one-way orifice plates (14) as they project both ways into the oceanic and atmospheric sides of the turbine housings (1 & 2). This central bulkhead casting will have bolt holes along the peripheral edge to connect the two containment domes (1 & 2). The casting will also include raised projections with holes to accept hinge pins for the hinged flapper lids that cover the one-way orifice plates (14). The casting will also include a center hole to nest one of the five axle shaft bearings (18).

As with the central bulkhead, the two outboard bulkheads will be a single, high density plastic casting (see drawing 1/7). Each of the two bulkheads will extend below the floor of the pre-cast concrete utility vault and into their respective turbine ducts (19 & 21, see page 7/7). This extension will cause the turbine's four chambers to be separated: two primary chambers (3 & 4) and two high velocity, inboard collector chambers (5).

The two outboard bulkhead castings (9 & 10) will contain holes that will nest two of five axle shaft bearings (18). The common axle shaft will have threaded holes bored and tapped into either end. One of the ends (atmospheric side) will have standard fine threads while the other (oceanic side) will have "left hand" fine threads. The shaft will terminate slightly inboard of the outer bearings which are nested in each of the pressure containment dome halves (1 & 2). This arrangement will facilitate removal of the axle shaft extensions that screw into the main axle and extend out of the dome halves to connect to the generators. When the axle extensions are unscrewed, the two containment dome halves can be opened up for cleaning or servicing of the turbine internals.

Depending on the turbine's rotor diameter, the pressure containment dome can be manufactured out of a material such as high density polyethylene for smaller versions. Larger configurations would use steel. The dome halves (1 & 2) would have flanged edges with bolt holes to connect the two half sections through the central bulkhead (13) and to the utility vault floor. This assures that the dense, corrosive marine air coming from the oscillating water column (21) does not affect the generators and electrical equipment housed in the utility vault.

The hinged flapper lids that cover the one-way, high velocity air orifice plates (14) will be manufactured of a durable, light weight plastic. Depending on the air flow cycle, only one of the two inboard collector chambers (5) will be pressurized from either the oceanic OWC (21) or the atmospheric bell mouth duct (19). Incoming air from one or the other duct will pass through the orifice plates and the rush of high velocity air will cause the hinged lids to rise off their seats. When the air flow cycle reverses, the pressure will subside and the flapper lids will close by their own weight. Simultaneously, the other bank of orifice plates will be energized by the other inboard collector chamber and its flapper lids will rise off their seats. Thus, only one or the other turbine rotor sets will have their collector vanes (7) and collector ports (8) energized with high velocity air. The combined function of the dual collector chambers (5) and their respective banks of orifice plates (14) is to provide high velocity air for enhanced angular momentum and inertia to the annulus (15). This high velocity air is then further utilized to power the turbulators (16) and jets (17) in each hollow airfoil blade (11) before it eventually rejoins the axial flow air stream in the turbine's primary chamber (3 & 4).

Depending on the OWC air flow cycle, pressurized air will enter the turbine's primary chamber from either the oceanic side or the atmospheric side. Air from either of these primary chambers (3 or 4) will pass through the corresponding fixed guide vanes set in their respective outboard bulkheads (9 or 10). These guide vanes direct the incoming air flow to impinge upon the leading edges of the airfoils (11) at an optimal angle of incidence, so as to derive the greatest lift and momentum for the specific airfoil design being utilized. Depending on the choice of interchangeable airfoil designs, the airfoil angle is adjusted to take full advantage of the fixed incoming air stream.

After passing the upstream airfoils (11), the air stream joins with the air exiting from the turbulators (16) and trailing edge jets (17). The jets deflect the air stream by bending it downwards. This has the beneficial effect of virtually extending the chord of the airfoils and increases the velocity of air over the airfoils' upper surfaces which reduces drag, enhances lift and mitigates stalling at lower turbine speeds. The turbulators are another subsystem element used in the airfoils' design. Pneumatic turbulators will delay flow separation in the boundary layer of the blades. The turbulators enhance lift and reduce aerodynamic stalling. The implementation of jets and turbulators makes it possible to avoid the need for complex (expensive) variable pitch blades designed to accomplish the same results.

As the air stream continues off the trailing edges of the upstream rotor ("drive" mode), the air passes through the curved, concave surfaces of the radial array of fixed guide vanes which are built into the central bulkhead (13). This curvature in the air stream allows air to pass smoothly off the "drive" turbine and onto the downstream or "freewheeling" turbine's trailing edges. The two rotor sets are placed back to back and are mirror images of each other. The air stream impinges upon the trailing edges and, in so doing, adds to the angular momentum of the "freewheeling" rotor. This is due to the airfoil's design characteristics: regardless of air flow direction, air impinging upon the trailing edges will impart a small amount of lift and positive unidirectional momentum to the blades (11). Regardless of the air flow direction, the upstream or "drive" rotor will transfer torque to the common axle shaft (18) by means of the sprag-type clutches (12) in the rotors' hubs. The downstream or "freewheeling" rotor will continue to spin in the same direction with only a small loss of inertia and causing minimal rotational resistance on the axle shaft.

After the airflow passes the downstream rotor, air goes into the primary chamber on the atmospheric side (3) of the turbine assembly. Air then exits out and into the surrounding atmosphere.

At this point, the rising wave cycle begins to recede within the wave capture chamber (20) and the declining OWC (21) water level begins to suck in a fresh charge of ambient air back through the elliptical bell mouth inlet and duct (19). The bell mouth and duct are designed to increase the speed of the incoming ambient air. The duct narrows down to exert a venturi-effect, adding velocity to the air stream before it enters the turbine's two atmospheric side chambers (3 & 5). As before, when the air stream was coming from the oceanic direction, the cycle is now reversed and the rotor on the atmospheric side is now in the "drive" or upstream mode.

The wave capture chamber (20) and OWC (21) casing will be carefully engineered to exploit the greatest amount of pneumatic energy. As with the venturi shape and narrowing of the atmospheric duct (19), the OWC duct (21) will also neck down to increase the velocity of air entering the turbine.

The cyclic nature of the passing oceanic waves provides a limitless source of potential energy for the above described invention. The resulting extraction of wave energy is economically harvested to simultaneously drive two electrical generating devices. The invention's innovative design permits the two generators to be placed outside of the turbine's pressure containment dome assembly where they can be easily serviced and maintained in a dry utility vault. This is accomplished with a single direct drive axle. This avoids complex transmissions and gearing that absorb the efficient transfer of rotational energy to the generators. The electrical generators can be standard induction type DC generators or modern Homopolar (relativistic) generators based on the Faraday Disc dynamo concept.

The foregoing details describe the turbine in its preferred embodiment. There exists the possibility that other improvements can be made to the current description but they are not intended to be part of this application. One such improvement might modify the use of the present turbine design to become a stand alone electrical generating power plant. This adaptation would implant powerful neodymium magnets into the rotating annular flanges in both rotors. The stationary bulkheads (stators) would have shrouds of insulated copper windings enclosing the rotating magnetic field. The turbine could become a high output generator, eliminating the need for external generators altogether.

The above mentioned adaptation notwithstanding, for the purpose of this patent application, specific claims are set forth on the following page.

It is claimed:

1. A wave energy conversion apparatus includes two turbine rotor assemblies have a unique back-to-back configuration comprised of central hubs, an array of asymmetrical airfoils attached at one end to their respective hubs and extending radially outward and attaching to identical diffuser tings which contain a plurality of peripheral vanes placed transversely to the plane of rotation and slanted outward in such a way as to collect a high velocity air stream from orifice plates for the purpose of maintaining the same angular momentum in both rotor sets; wherein
    the two turbine rotor assemblies have a unique back-to-back configuration comprised of central hubs, an array of asymmetrical airfoils attached at one end to their respective hubs and extending radially outward and attaching to identical diffuser tings which contain a plurality of peripheral vanes placed transversely to the plane of rotation and slanted outward in such a way as to collect a high velocity air stream from orifice plates for the purpose of maintaining the same angular momentum in both rotor sets; wherein
    the back-to-back asymmetrical airfoils making up the two turbine rotor sets, have the leading edges facing outward from one another and with the trailing edges pointing inward towards one another so the two rotors will turn on a common axis parallel to each other in a mirrored configuration; wherein
    the back-to-back asymmetrical airfoils in both rotor sets are attached to central hubs which contain sprag-type, clutch mechanisms that will allow either rotor to function alternately as a drive rotor while the other rotor alternately functions as a freewheeling rotor thus permitting a continuous inertial rotational force to turn the common drive shaft in only one direction at all times within the reciprocating OWC/OAC air flow environment; wherein
    the asymmetrical airfoil blades making up each rotor are hollow, thus permitting the passage of high velocity air to enter from collector ports in both diffuser tings and is used to energize lift-enhancing subsystem elements such as pneumatic turbulators and trailing edge jets and these elements finally exhaust the used high velocity air into the axial air stream of the primary turbine ducts; wherein
    the asymmetrical airfoil blades making up each rotor set are shaped in such a way that lift is generated regardless of the direction of air flow so that a maximum amount of lifting force is achieved as air impinges upon the leading edges of the airfoils but, to a lesser degree, a lifting force is also achieved when the reversing air flow of the OWC/OAC impinges upon the trailing edges of the airfoils.

2. An apparatus as claimed in claim 1 wherein the back-to-back asymmetrical airfoils making up the two turbine rotor sets, have the leading edges facing outward from one another and with the trailing edges pointing inward towards one another so the two rotors will turn on a common axis parallel to each other in a mirrored configuration.

* * * * *

UNITED STATES PATENT AND TRADEMARK OFFICE
CERTIFICATE OF CORRECTION

| | | |
|---|---|---|
| PATENT NO. | : 8,358,026 B2 | Page 1 of 1 |
| APPLICATION NO. | : 13/136409 | |
| DATED | : January 22, 2013 | |
| INVENTOR(S) | : John Clark Hanna | |

It is certified that error appears in the above-identified patent and that said Letters Patent is hereby corrected as shown below:

In the Claims:

Please delete the entire CLAIMS section published for the above referenced patent. The text to be removed begins at Column 7, Line 29 and ends at Column 8, Line 41. The corrected CLAIMS are shown below:

-- A wave energy conversion apparatus that includes two turbine rotor assemblies that have a unique back-to-back configuration comprised of central hubs, an array of asymmetrical airfoils attached at one end to their respective hubs and extending radially outward and attaching to identical diffuser rings which contain a plurality of peripheral vanes placed transversely to the plane of rotation and slanted outward in such a way as to collect a high velocity air stream from orifice plates for the purpose of maintaining the same angular momentum in both rotor sets;

wherein the back-to-back asymmetrical airfoils in both rotor sets are attached to central hubs which contain sprag-type, overrunning clutch mechanisms that will allow either rotor to function alternately as a drive rotor while the other rotor alternately functions as a freewheeling rotor thus permitting a continuous inertial rotational force to turn the common drive shaft in only one direction at all times within a reciprocating air flow environment;

wherein the asymmetrical airfoil blades making up each rotor are hollow, thus permitting the passage of high velocity air to enter from collector ports in both diffuser rings and is used to energize lift-enhancing subsystem elements such as pneumatic turbulators and trailing edge jets and these elements finally exhaust the used high velocity air into the axial air stream of the primary turbine ducts;

wherein the asymmetrical airfoil blades making up each rotor set are shaped in such a way that lift is generated regardless of the direction of air flow so that a maximum amount of lifting force is achieved as air impinges upon the leading edges of the airfoils but, to a lesser degree, a lifting force is also achieved when the reversing air flow impinges upon the trailing edges of the airfoils;

wherein a cumulative effect of both alternately engaged freewheeling clutches upon the common drive shaft will allow for a smooth and linear application of torque to two generators which are attached at either end of the common drive shaft.--

Signed and Sealed this
Twenty-third Day of July, 2013

Teresa Stanek Rea
*Acting Director of the United States Patent and Trademark Office*